(12) United States Patent
Mantell (10) Patent No.: US 7,317,556 B2
(45) Date of Patent: Jan. 8, 2008

(54) METHOD FOR ERROR DIFFUSION EMPLOYING A STAMP FIELD

(75) Inventor: David A. Mantell, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1003 days.

(21) Appl. No.: 10/741,561

(22) Filed: Dec. 19, 2003

(65) Prior Publication Data

US 2005/0134920 A1  Jun. 23, 2005

(51) Int. Cl.
*H04N 1/407*  (2006.01)
*H04N 1/409*  (2006.01)

(52) U.S. Cl. .................. 358/3.03; 358/3.05; 358/3.22; 382/252

(58) Field of Classification Search ...... 358/3.03–3.05, 358/3.21–3.22, 1.9, 3.26, 465–466; 382/251–252, 382/270, 275
See application file for complete search history.

(56) References Cited

U.S. PATENT DOCUMENTS

| | | | | |
|---|---|---|---|---|
| 5,055,942 A | * | 10/1991 | Levien | 358/3.03 |
| 5,150,429 A | * | 9/1992 | Miller et al. | 358/3.03 |
| 5,305,395 A | | 4/1994 | Mahoney et al. | |
| 5,307,425 A | * | 4/1994 | Otsuka | 382/252 |
| 5,325,211 A | * | 6/1994 | Eschbach | 358/3.05 |
| 5,535,019 A | * | 7/1996 | Eschbach | 358/3.03 |
| 5,610,999 A | | 3/1997 | Bannai et al. | |
| 5,737,453 A | * | 4/1998 | Ostromoukhov | 358/3.03 |
| 5,917,614 A | | 6/1999 | Levien | |
| 6,014,233 A | | 1/2000 | Fan et al. | |
| 6,160,921 A | | 12/2000 | Marcu | |
| 2003/0107769 A1 | | 6/2003 | Kang | |
| 2003/0160983 A1 | | 8/2003 | Lee | |
| 2005/0134921 A1 | * | 6/2005 | Mantell | 358/3.03 |
| 2005/0135673 A1 | | 6/2005 | Mantell | |
| 2005/0135674 A1 | * | 6/2005 | Mantell | 358/3.03 |

OTHER PUBLICATIONS

G. Marcu, "Error diffusion algorithm with output position constraints for homogeneous highlight and shadow dot distribution", Journal of Electric Imaging, Jan. 2000, vol. 9(1), pp. 46-51.*
G. Marcu, "An error diffusion algorithm with output constraints for homogeneous highlight and shadow dot distribution", Proceedings of The International Society for Optical Engineering, vol. 3300, pp. 341-352 (1998).*
Kang et al.; A Channel dependent color error diffusion method based on the distance constraint, Dec. 2003; SPIE vol. 5293 306-313.
Kang et al.; A principle distance constraint error diffusion algorithm for the homogeneous dot distribution, Jan. 2000; SPIE vol. 3963 510-520.

* cited by examiner

*Primary Examiner*—Scott A. Rogers (57) ABSTRACT

A method for processing image data that employs a stamp field that contains data representing a distance metric for use with a variety of error diffusion operations. The distance metric possesses distance-order preservation permitting the distance from a previous dot to be determined by incrementing the distance metric, without knowing precisely where the previous dot was printed.

19 Claims, 5 Drawing Sheets

METHOD FOR ERROR DIFFUSION EMPLOYING A STAMP FIELD

Cross reference is made to the following commonly assigned, related U.S. patent application entitled "Method for Processing Color Image Data Employing a Stamp Field," to David A. Mantell, application Ser. No. 10/741,703 filed Dec. 19, 2003.

The present application relates generally to methods for processing image data. More particularly, the teachings herein are directed to a quantization process employing a distance constraint.

Digital images are commonly represented as one or more separations, with each separation conventionally represented as a monochromatic bitmap, which may be described as an electronic image with discrete signals or pixels defined by position and density. Monochromatic images typically are represented with a single separation while color images commonly are represented as two or more separations. Each separation commonly comprises a set of color density signals (pixels) for a given color wherein the density level (pixel value) is given as one of a number of possible levels. When a plurality of density levels are used, the density level (pixel value) may be referred to as the "gray level" without reference to the actual color. For example, in the case of a color image with three defining separations (e.g., Cyan, Magenta and Yellow), the gray levels (pixel values) for the Cyan separation simply identify the density of the cyan at the given location within the image.

Common input devices such as document scanners, computer imagery generators and digital cameras are capable of describing an image with a large number of gray levels representing a "continuous-tone" image. That is, each pixel of such a continuous-tone image has a value or gray level that lies in a particular range, with 256 or more gray levels for each separation being common. That is, if an 8-bit binary word represents such a pixel, the pixel can have 256 distinct color values. Output devices, including, for example, electrostatographic printers, ink-jet printers, and LCD arrays, represent such an image by generating a plurality of picture elements or pixels on an output medium. Such output devices, however, typically provide only a few output levels or output states for each pixel.

Accordingly, before generating such an output image, the pixels within the continuous-tone image data are processed by comparing the gray level of a pixel with one or a number of thresholds, to assign to one of a set of output states to the pixel. The difference between the value (or gray level) of a pixel and the gray level corresponding to the output level (or output state) for the pixel introduces quantization artifacts into the printed image. Error diffusion is a well known technique of processing image data that attempts to maintain the total intensity or "gray content" of an image when converting an image comprising pixels having one set of gray levels to an image comprising pixels having a different set of gray levels. In general, error diffusion methods typically forwardly distribute fractional portions of the quantization error associated with a pixel to a selected group of pixels or to a set of neighboring pixels in an image. That is, the quantization error is diffused across the image. The fraction of the error added to each neighbor depends on a set of weights, the total error being multiplied by the weight corresponding to a given neighbor and then added to the value of that neighbor. The choice of weight can greatly affect the image quality, and much has been said about weights appropriate for giving pleasing results.

Error diffusion methods, however, can create a number of artifacts in the image. One such artifact, commonly referred to as "worms", become noticeable for relatively large regions of uniform or gradually varying color, particularly in areas of highlights. The "worms" appear as curved or straight diagonal lines in areas of uniform or gradually varying gray or produce a patterned appearance in the image. Similarly, worms of holes (also referred to as "worm holes" or simply holes) appear as patterns of curved or straight diagonal lines of white or lighter gray content in shadow regions.

One method to eliminate or reduce the occurrence of worms and/or worm holes in error diffused images is through the use of stamp functions. Stamp functions operate to eliminate or reduce worms and/or worm holes in error diffusion by changing the threshold in the region around where a pixel is printed in a manner which will tend to suppress the clustering of like pixels over a wider region than is possible with a reasonable number of weights in the error distribution function. Briefly, with stamp functions the thresholds for quantization are dynamically adjusted in accordance with previous quantization results by adding a stamp array to the thresholds to selectively control likelihood of whether the next pixel will exceed the threshold. A typical stamp array is a one dimensional array centered on the current pixel. The array operates to imprint or add successively smaller modifiers to the thresholds for a set of pixels near the current pixel. The stamp array has the effect of locally changing the probability for a pixel to be set to print (or not print). In order to prevent the threshold function from growing too large (or too small) as well as limiting the extent of a stamp array in the fastscan direction, the dampened threshold array of the previous scanline is used to generate the initial threshold values for the current scanline. The dampening ensures that the effect of a stamp array is lost/dampened over a number of scanlines. Thus the stamp function acts as a distance metric built into the threshold, the form for a given gray level chosen to encourage subsequent like pixels from printing too close to a previously processed one.

A more complete discussion of error diffusion methods, weighting coefficients and stamp functions can be found in the following references which are incorporated by reference herein for their teachings: U.S. Pat. No. 5,535,019, entitled "Error Diffusion Halftoning with Homogenous Response in High/Low Intensity Image Regions"; U.S. Pat. No. 5,353,127, entitled "Method for Quantization Gray Level Pixel Data With Extended Distribution Set"; U.S. Pat. No. 5,608,821 entitled "Method of High Addressability Error Diffusion"; U.S. Pat. No. 5,696,601 entitled "System and Method for Redistributing Error Values from an Error Diffusion Process"; U.S. Pat. No. 5,768,432 entitled "System and Apparatus for Pixel Growth Compensation in a Hybrid Error Diffusion Process"; and U.S. Pat. No. 6,608,700 B1 entitled "Removal of Error Diffusion Artifacts with Alternating Distribution Weights." It should be appreciated that the references cited above are but a small sample of the available error diffusion techniques known in the art and the teachings herein are not limited to the diffusion techniques shown therein.

Another method designed to eliminate or reduce the occurrence of worms and/or worm holes in error diffused images employs a distance or spatial constraint. The spatial constraint performs a function similar to that of stamp functions in that the spatial constraint is designed to suppress the clustering of printed pixels within highlights (non-printed pixels within shadows) over a wider region than is possible with an error distribution function. When employing a spatial constraint, the error diffusion operation determines the distance between the current pixel the nearest dot. If the distance is less than the spatial constraint, the operation inhibits or postpones the generation of a dot. That is, a dot may be output only if a distance constraint between the current pixel and neighboring dots is satisfied.

In one operation, the distance to previous dots is found by searching a set of nearby pixels in a predetermined order until either a dot is found or the entire set of pixels has been searched. In another operation, the Euclidean distance to the nearest pixel is checked for each new pixel to determine the distance to the nearest pixel. Based on the distance, the quantization threshold is modified to encourage or discourage dots. A more complete discussion of spatial or distance constraints can be found in the following references: U.S. Pat. No. 6,160,921 entitled "Error Diffusion with Homogeneous Distribution in Highlight and Shadow Regions" and U.S. Pat. No. 5,917,614 entitled "Method and Apparatus for Error Diffusion Screening of Images with Improved Smoothness in Highlight and Shadow Regions".

While the error diffusion techniques described above provide means for quantizing a continuous-tone image with reduced artifacts, they are not optimal. For example, the use of spatial constraints can require intensive calculations and/or special hardware to store/identify nearest printed dot and determine the determine the distance thereto. Similarly, searching or reviewing predefined sets of pixels surrounding a given pixel location to determine the existence of prior printed dots can require extensive processing resources. Thus, these systems can be complex and difficult to implement and can increase processing time. Moreover, there is always desired a method or system which provides an improvement on existing systems or methods. Such improvement may come in the form of improved performance, efficiency, and/or cost, and may include, but is not limited to one or more of reduced hardware or software complexity, reduced system resource requirements (e.g., processing and/or memory), increased speed, increased accuracy, etc.

In accordance with one or more aspects of the teachings herein, there is described a method for processing image data including a plurality of scanlines with each scanline having a plurality of pixel positions. The method receives an input pixel, the input pixel being located at an input pixel position within a current scanline and determines, using values within a stamp field array SF, a stamp field value SF(x) corresponding to the input pixel position within a scanline. The method sets a threshold value as a function of the stamp field value SF(x) corresponding to the input pixel position and quantizes the input pixel based upon a comparison of the threshold value with a gray level for the input pixel.

In accordance with one or more aspects of the teachings herein, there is described a method for processing image data including a plurality of scanlines with each scanline having a plurality of pixel positions. The method includes receiving an input pixel, the input pixel being located at an input pixel position within a current scanline; generating a stamp field value SF(x) for the input pixel position within a stamp field based on values within the stamp field wherein each stamp field value comprises a distance metric for a pixel position within a scanline; setting a threshold value as a function of the stamp field value SF(x); and quantizing the input pixel based upon a comparison of the threshold value with a gray level for the input pixel.

In accordance with one or more aspects of the teachings herein, there is described a An image processing method which receives color image data comprising a plurality of color separations, each color separation including a plurality of scanlines, each scanline having a plurality of separation pixels with each separation pixel being located at a pixel position within the scanline. The method generates a sum S of a first separation pixel and a second separation pixel, the first separation pixel being located at an input pixel position within a current scanline within a first color separation and the second separation pixel being from a second color separation, wherein the second separation pixel is located at the input pixel position within a scanline corresponding to the current scanline; determines a distance from the input pixel position to a dot within at least one of the first color separation and the second color separation; derives a threshold value based on the distance; and generates a first output value for the first separation pixel and a second output value for the second separation pixel based on a comparison of the sum S with the threshold value.

In accordance with one or more aspects of the teachings herein, there is described a method for processing color image data comprising at least a first color separation and a second color separation, the first color separation including a first color separation pixel and the second color separation including a second color separation pixel. The method includes receiving the first color separation pixel and the second color separation pixel, the first color separation pixel and the second color separation pixel corresponding to a common pixel location within the image data; generating a sum S of the first color separation pixel and the second color separation pixel; determining a distance from the common pixel location to a pixel position corresponding to a dot within the first color separation or the second color separation using a stamp field; deriving a threshold value based on the distance; and generating a first output value for the first separation pixel and a second output value for the second separation pixel based on a comparison of the sum S with the threshold value.

The teachings and embodiments disclosed herein may be described with reference to the accompanying drawings, which are provided for purposes of illustrating various aspects of the teachings and embodiments and are not to be construed as limiting the same, wherein.

Figure 1:
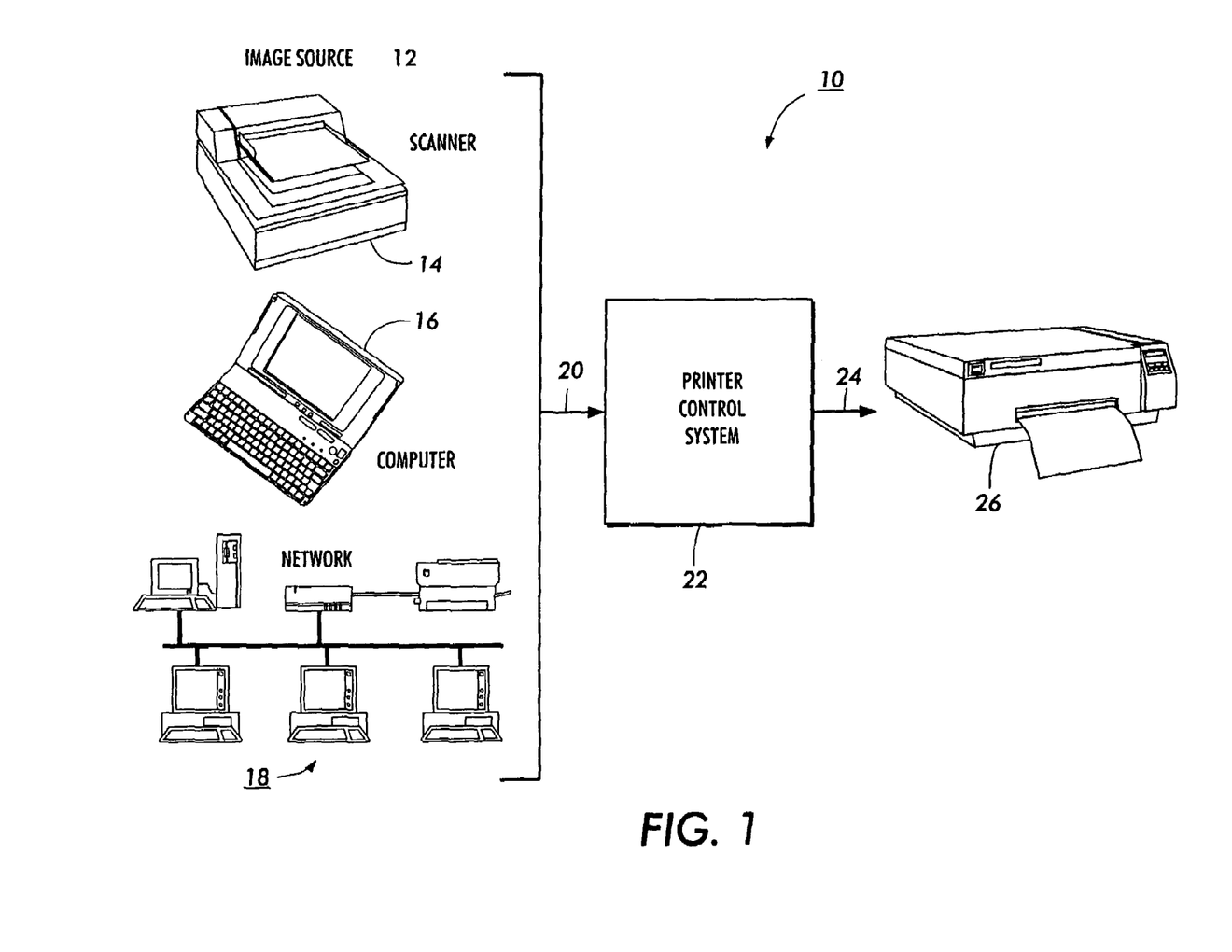
FIG. 1 shows an embodiment of an exemplary printing system which incorporates one or more of the teachings disclosed herein.

Turning to FIG. 1, there is shown an embodiment of an exemplary printing system 10 that incorporates the features disclosed herein. Printing system 10 includes image source 12 that may include scanner 14, computer 16, network 18 or any similar or equivalent image input terminal providing image data 20 which may be any combination of ASCII data, bitmapped image, scanned image data, pixel image data, geometric data, graphics primitives, page description language, etc. Image data 20 is supplied to printer control system 22 which processes the received image data 20 to produce print data 24 that drives image output terminal (IOT) 26.

In one embodiment, printer control system 22 may comprise what is commonly referred to in the art as a print driver. Printer control system 22 may also comprise a digital front end or similar controller driving IOT 26. Those skilled in the art will recognize that control system 22 may be implemented in hardware and/or software and may reside within image source 12, within IOT 26, within a separate component or in any combination thereof. In response to print data 24, which may comprise image data and/or printer control signals (e.g., paper handling, finishing options, carriage control, ink deposition), IOT 26 generates an output image on a suitable medium (e.g., print or display).

It will become evident from the following discussion that IOT 26 may comprise any one of a number of printing devices including, but not limited to, electrostatographic printers (e.g., laser, electrophotographic, ionographic), liquid ink printers (e.g., drop-on-demand; phase change wax-based; piezoelectric, acoustic, or thermal inkjet), etc. Furthermore, the teaching are not limited in there application to copying and printing machines and may be incorporated in other output devices such as electronic display systems including CRTs, LCDs, LED, etc.

Aspects of the teachings and/or embodiments discussed herein are generally useful as features or characteristics of printer control system 22 depicted in FIG. 1; however, the teachings and embodiments disclosed herein are not limited in their application to such a system. The teachings herein relate generally to a thresholding operation which employs a stamp field to control the generation of the threshold. The stamp field contains data representing a distance metric (such as distance from a prior pixel or a range for threshold adjustment) from which a quantization threshold can be generated. In particular, the teachings described herein can be employed in an error diffusion operation. Briefly reviewing, in an error diffusion operation, the input gray level for the current pixel is received. A modified modify gray level is obtained by adding any error diffused to the current pixel to the input gray level for the current pixel. The modified gray level is compared to a reference signal or threshold to determine the output state for the current pixel. That is, based on the comparison, the process determines whether or not to print a dot. In the context of the present disclosure, the term "dot" is used to identify an output state corresponding to white in a shadow region, or a black in a highlight region. That is, a dot has a quantized value which is complementary to the grayscale values associated with the region. After setting the output state, the operation obtains the difference between the input level of the current pixel and that of the output level as an error value. Subsequently, distributed or diffused errors are calculated from the error value using any well known error distribution process.

For purposes of description, continuous-tone image data can be considered as a set of pixels arranged in an array of Y scanlines with each scanline containing X pixels. Thus, each pixel within the image can be identified by a unique set of (x,y) coordinates with y identifying the scanline and x identifying position across the scanline. For purposes of description, each pixel in the continuous-tone image can be considered to be one of 255 gray levels wherein a gray level of 255 corresponds to 100% density (e.g., black) and a gray level of 0 corresponds to a 0% density (e.g., white). However, it should be appreciated that a different number of gray levels can be used, and that the present teachings can be readily adapted to applications wherein a gray level of 255 corresponds to an output density of 0 while a gray level of 0 corresponds to an output density of 100%.

As previously discussed, prior implementations employing spatial constraints to reduce or eliminate the occurrence of worms and/or worm holes have been relatively complex requiring computationally intensive calculations to determine the distance to nearest printed dot and/or entailing the search or review of predefined areas surrounding a given pixel location to determine the existence of prior dots. To reduce the complexity of prior methods using spatial constraints, teachings herein make use of a stamp field. The stamp field contains data representing a distance metric. The metric should be such that the field can be calculated from previous points in the field without continual reference to prior printed points. The metric can, for example, identify a distance from a prior printed pixel or a range for threshold adjustment. Employing a taxi cab or city-block distance when generating distance metrics for a stamp field has the advantage that it can be calculated easily as part of the normal transversing of the image in the error diffusion algorithm.

The city-block or taxi distance between two points (x,y) and (x',y') is given by $D=|x-x'|+|y-y'|$. Using a city-block distance to track distance to a prior pixel within an image provides several advantages over computing the a Euclidean distance. One advantage of the city-block distance is that it is easy to calculate, requiring only addition, whereas determination of Euclidean distance ($D=\sqrt{(x-x')^2+(y-y')^2}$) requires a great deal more computation. Another advantage of the city-block distance is that is simplifies the comparison of distances between points. Specifically, unlike Euclidean distances, city-block distances can be said to possess distance-order preservation.

Figure 2:
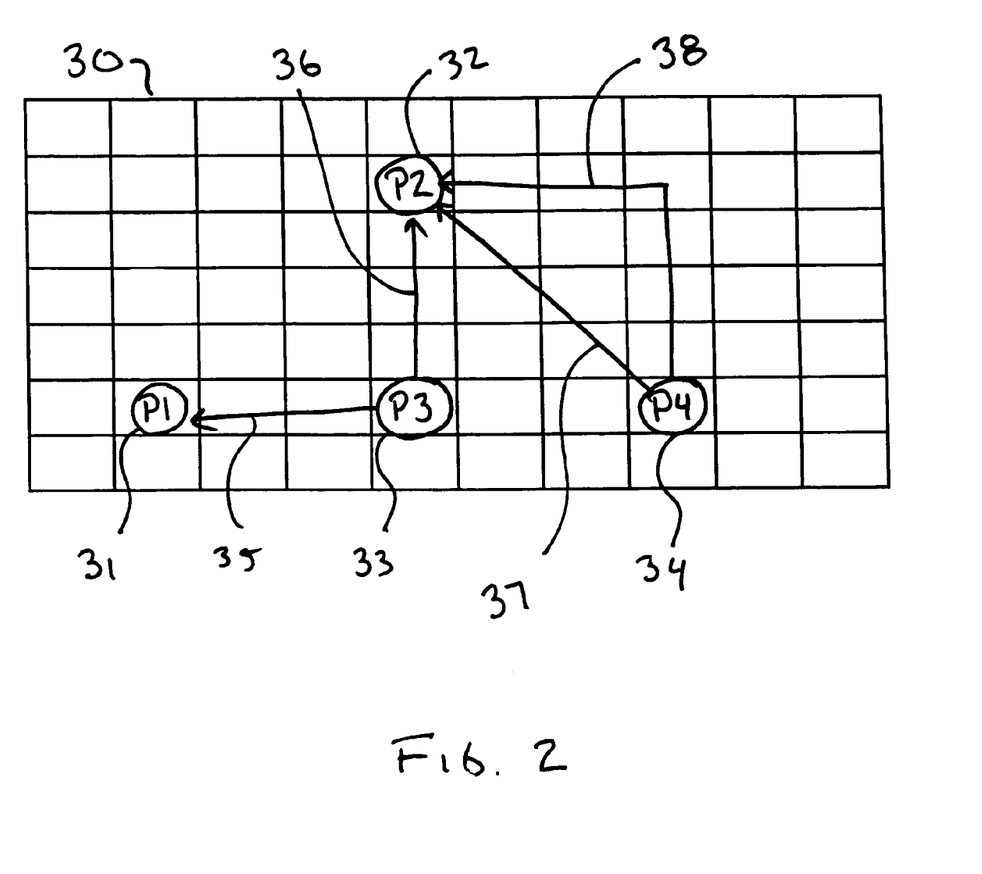
FIG. 2 illustrates the preservation of the ordering of the distance between points using city-block distance.

The property of distance-order preservation is illustrated in FIG. 2, which shows a grid 30 having four points 31, 32, 33, and 34 identified as $P_1$, $P_2$, $P_3$, and $P_4$, respectively. At point $P_3$ the Euclidean distances to points $P_1$ and $P_2$ (illustrated by arrows 35 and 36) are 3 and 4 units, respectively. Similarly, the city-block distances to points $P_1$ and $P_2$ are also 3 and 4 units, respectively. At point $P_4$ the Euclidean distance to point $P_1$ is 6 units and the Euclidean distance to point $P_2$ (shown by arrow 37) is 5 units. However, the city-block distance from $P_4$ to point $P_1$ is 6 units and the city-block distance from $P_4$ to $P_2$ (shown with arrow 38) is 7 units. That is, as the grid (e.g. image data) is traversed from point $P_3$ to $P_4$, the "closer" point ($P_1$ or $P_2$) changes in a Euclidean sense but not in a city-block sense. Thus, with the city-block distance, point $P_1$ is the closer and always remains so. More particularly, for any given pixels $(x_1,y_1)$ $(x_2,y_2)$ and $(x_3,y_3)$ within an image, if the distance from $(x_3,y_3)$ to $(x_1,y_1)$ is less than the distance from $(x_3,y_3)$ to $(x_2,y_2)$ then at any given pixel $(x_4,y_4)$ the distance from $(x_4,y_4)$ to $(x_1,y_1)$ will be less than the distance from $(x_4,y_4)$ to $(x_2,y_2)$ for $x_1$, $x_2 \leq x_3 < x_4$ or $x_1$, $x_2 \geq x_3 > x_4$ and $y_1$, $y_2 \leq y_3 \leq y_4$.

In summary, one aspect of the teachings herein is the use a stamp field which contains data representing a distance metric for threshold generation. The distance metric possesses distance-order preservation and is simple to calculate. Preserving the ordering of the distances from prior dots provides a benefit in that the method never needs to compare distances to individual dots. Thus, there is no need to store the location of prior dots or to retain data to locate prior dots. The distance from a previous dot can be determined by simply incrementing the distance metric, without knowing precisely where the previous dot was printed. That is, once a dot is printed, the method can track the distance by increasing the distance metric from previously processed pixels. Simply incrementing values to track distance allows the distance determination to be done in real time without employing resources for complex calculations or using additional memory to store a large table of pre-computed distances. Storing these distance values in a stamp field provides a convenient and efficient mechanism to implement this. Although the stamp field described herein contains a distance metric based on a city-block distance calculation, another method for distance calculation may be used provided the method possesses distance-order preservation.

Figure 3:
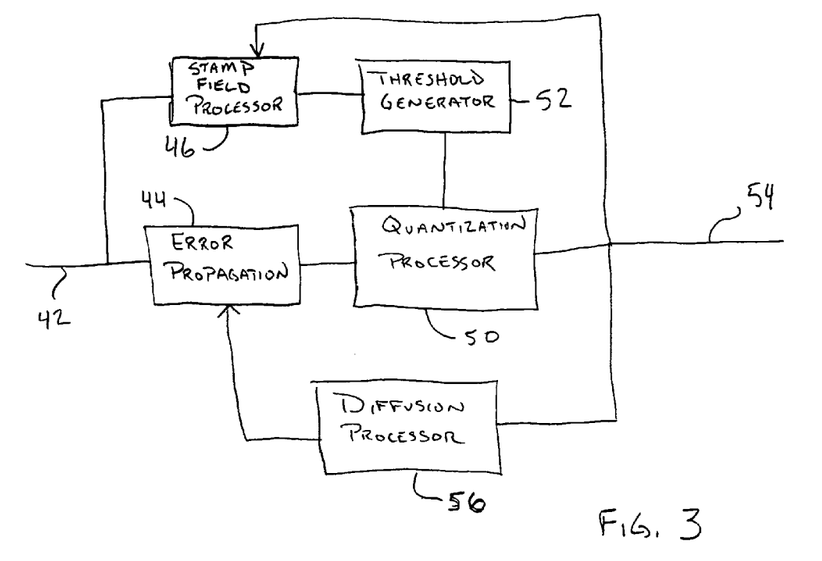
FIG. 3 Illustrates the data flow in an embodiment of an error diffusion processor which employs a stamp field.

Referring to FIG. 3, there is shown an embodiment of an error diffusion system 40 incorporating one or more aspects of the teachings herein. In FIG. 3, image data 42 comprising the gray level $i(x,y)$ of the current separation pixel at $(x,y)$ is received at error propagation circuit 44 and at stamp field processor 46. Error propagation circuit 44 also receives distributed error signal 48 comprising distributed error $e(x,y)$ for the previously processed separation pixels to be applied to the current separation pixel. Propagation circuit 44 adds the distributed error $e(x,y)$ to the input gray level $i(x,y)$ received as image data 42 to obtain modified pixel value $i'(x,y)$ which is then supplied to quantization processor 50.

Stamp field processor 46 determines a distance metric for the stamp field $SF(x,y)$ at current pixel that represents the distance from the closest dot. The distance metric is distance-order preservation metric that is simple to calculate. Various alternatives for determining the distance metric which employ concepts of city-block distances are described in more detail below. Stamp field processor 46 may employ any of the various alternatives for determining the distance to the closest dot in accordance with the teachings herein.

Threshold generator 52 sets a threshold T, which is supplied to quantization processor 50 for use in quantizing the current pixel. Briefly, threshold generator 52 sets a threshold T based on a function the distance metrics in the stamp field determined by processor 46. The function of the stamp field is to suppress the generation of dots if the nearest dot is to close. To suppress the generation of dots, threshold generator 52 modifies a base threshold for the current pixel by adding a term to the base threshold which may be based on the value in the stamp field $SF(x,y)$ and/or a gray level for the input pixel. To vary the distance criteria, threshold generator 52 employs a table of stamp distance values $SD(i)$. As an alternative to setting the distance criterion based on the input gray level or the modified gray level of the input pixel, the method may retain a running average of gray levels of nearby pixels in identifying the distance criterion. That is, the distance metric within the stamp field may be compared to $SD(i^*)$, wherein $i^*$ is the average gray level of pixels near the input pixel.

If the distance criterion as determined by the stamp field is not met the threshold is modified. In one embodiment, the threshold is modified according to:

$$T=T(x,y)+T'(i,SF(x,y)) \text{ if } SF(x,y)<SD(i); \text{ otherwise}$$
$$T=T(x,y).$$

wherein $T(x,y)$ is the initial threshold for the current pixel and T' is the adjustment to the threshold. These stamp distance values are in fact typically set to some value a small amount less than the optimal distance between dots as measured by the metric. This allows the error diffusion algorithm to comfortably adjust to startup and changes in tone, while still moving toward a nearly optimum distance between dots.

The threshold adjustment term T' serves to suppress printing a drop at the current pixel if there is another one nearby. The adjustment term T' is shown as a function of the a gray level for the current pixel (the input gray level $i(x,y)$ or the modified gray level $i'(x,y)$) and the stamp field. However, it should be appreciated that the threshold adjustment term need not be a function of both the gray level and the distance metric of the stamp field and can be based solely on the gray level or the stamp function. Moreover, it should be appreciated that the threshold adjustment term T' can be a constant. In addition, it should be appreciated that for some gray levels $SD(i)=0$ for which there would be no modification to the threshold $T(x,y)$. As the metric might be used only to eliminate worms and worm holes, which are generally limited to regions corresponding to highlights or shadows, adjustments to the threshold $T_0$ would not be needed for such gray levels.

Quantization processor 50 compares the modified gray level for the current pixel $i'(x,y)$ to the threshold T to obtain an output signal 54 having an output value $o(x,y)$ for the current pixel. More specifically, processor 50 may compare the modified gray level for the current pixel to the threshold T to determine whether to generate a dot. For example, in a region corresponding to a highlight, if the modified gray level $i'(x,y)$ is greater than the threshold T, the illustrative method sets the output $o(x,y)$ to a value that correspond to generating a dot.

The output value $o(x,y)$ generated at processor 50 is supplied to diffusion processor 56 and stamp field processor 46. Stamp field processor 46 uses the output value to update and/or reset any distance measurements and/or variables used for determining the distance to closest dot when processing subsequent pixels. Diffusion processor 54 determines a quantization error based on the output value and diffuses the quantization error associated with the current pixel to a selected group of neighboring pixels in the image. As will be appreciated, the neighboring pixels are not limited to those pixels which are directly adjacent to the current pixel but can include other pixels as well. The determination and distribution (diffusion) of the quantization error can be accomplished using any common error diffusion technique available. Such techniques typically distribute a weighted fractional portion of the quantization error to each of selected group of neighboring pixels. The group of neighboring pixels receiving a weighted error as well as the weighting coefficients can remain constant or be dynamically modified. The weighted fractional portions are often selected such that their sum is one; however, those skilled in the art will recognize that such condition is not necessary.

Figure 4:
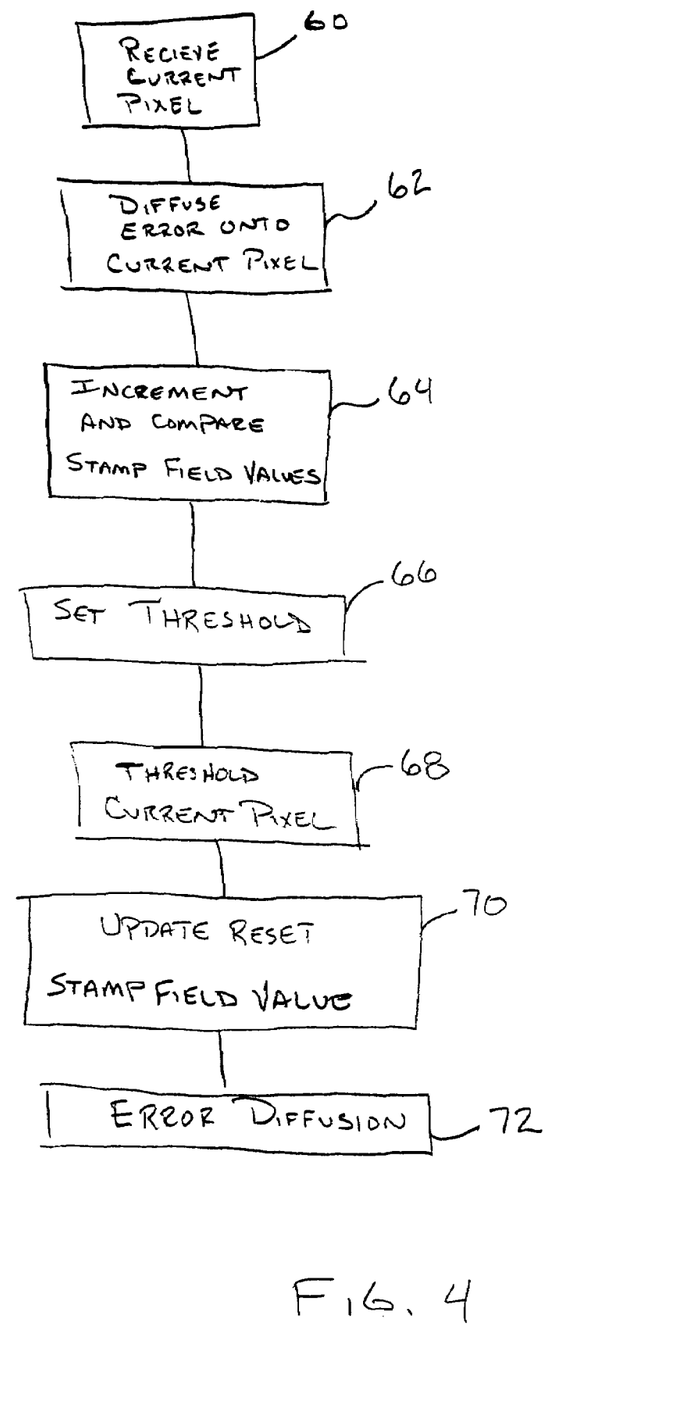
FIG. 4 is a flow chart illustrating various steps in one embodiment of a quantization method which employs a stamp field.

Referring to FIG. 4, there is shown an embodiment of an error diffusion method which includes a distance metric in accordance with teachings disclosed herein. Briefly, the illustrative method begins at a step 60 with the receipt of a pixel at position $(x_n,y_m)$ having a gray level $i(x_n,y_m)$. At a step 62, the total distributed error $e(x_n,y_m)$ diffused onto the current pixel as a result of prior thresholding and diffusion processing is added to the gray level for the current pixel $i(x_n,y_m)$ to obtain modified pixel gray level $i'(x_n,y_m)$.

In a step 64, the illustrative method increments and compares the values of the stamp field for the previous point on the current scanline (i.e., $SF(x_{n-1},y_m)+1$) and the stamp field for current point from previous scanline (i.e., $SF(x_n,y_{m-1})+1$). In a step 66, the illustrative method updates the stamp field value for the current pixel $SF(x_n,y_m)$ with the lesser of the two. Having determined the distance to the closest dot, the illustrative method sets a threshold T as a function of the stamp field $SF(x_n,y_m)$ at a step 68. At a step 70, the illustrative method quantizes the modified gray level for the current pixel $i'(x_n,y_m)$ to one of set of available output values. More specifically, the method compares the modified gray level for the current pixel to the threshold T to determine an output value identifying whether to generate a dot for the current pixel.

At a step 72, the method resets the value of the stamp field $SF(x_n,y_m)$ to an initial value if the output value correspond to a dot. In one embodiment, when the output is set to generate a dot, the method resets the value of the stamp field is set to 0. At step 74, the illustrative method employs any common or well known error diffusion technique to diffuse a quantization error associated with the current pixel to a selected group of neighboring pixels in the image.

Having briefly described the operation of illustrative embodiments of a system and a method for a quantizing image data in an error diffusion operation, attention will know be turned to a discussion of various options for determining distance and selecting a threshold.

As described above, two advantages of basing the distance metric on city-block distances are the ease of calculation and distance-order preservation. In a first illustrative embodiment for determining distance which incorporates these benefits of city-block distances stamp field processor 46 and threshold generator 52 (steps 64-68) operate to determine the values of the stamp field in the following manner. Briefly, if the value of the distance metric (e.g., distance to the closest dot) at the previous pixel position stored in the stamp field, e.g., $SF(x_{n-1},y_m)$, is given by D, then at the current pixel $(x_n,y_m)$ the city-block distance to that dot will be D+1. This value (D+1) is compared to the stamp field value for the current point on the previous scanline incremented by one to give a current city-block distance. That is, if $SF(x_n,y_{m-1})=D'$, then the city-block distance to the dot will be given by D'+1. The minimum of the two is used for the current stamp field $SF(x_n,y_m)$. That is, $SF(x_n,y_m)$ will be set to the lesser of D+1 and D'+1.

Having determined the distance to the closest dot, a threshold can be selected using the distance in the manner previously described. That is, the distance metric can be compared to the distance criterion SD(i) with the threshold being modified in the following manner:

$T=T(x_n,y_m)+T'(i, SF(x_n,y_m))$ if $SF(x_n,y_m)<SD(i)$; otherwise $T=T(x_n,y_m)$.

wherein $T(x_n,y_m)$ is the initial threshold for the current pixel and T' is the adjustment to the threshold.

In describing the various embodiments, the stamp field is addressed as if it were a two-dimensional array of values, e.g., $SF(x,y)$, to provide increased clarity in the operation thereof. However, it should be appreciated that, from a practical standpoint, only one value of the stamp field needs to be saved for any value of $x_n$ since the point $SF(x_n,y_{m-1})$ is no longer needed after the aforementioned operation. That is, $SF(x_n)$ for the previous scanline is only needed in determining the value of $SF(x_n)$ for the current scanline, e.g., $SF(x_n)$ updated to equal the lesser of $SF(x_{n-1})+1$ and $SF(x_n)+1$.

An example of the operation of the above described method is illustrated with reference to Table 1 which shows the distance D to the closest dot at each pixel position within three scanlines $y_1$, $y_2$, $y_3$.

TABLE 1

|   | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|----|----|----|----|----|----|----|----|----|----|----|----|
| $y_1$ | 0 | 1 | 2 | 3 | 4 | 5 | 6 | 7 | 8 | 9 | 10 | 11 | 12 | 13 | 0 | 1 | 2 | 3 | 4 | 5 | 6 |
| $y_2$ | 1 | 2 | 0 | 1 | 2 | 3 | 4 | 5 | 6 | 7 | 8 | 9 | 10 | 11 | 1 | 2 | 3 | 4 | 5 | 6 | 7 |
| $y_3$ | 2 | 3 | 1 | 2 | 3 | 4 | 5 | 6 | 7 | 8 | 9 | 10 | 11 | 12 | 2 | 3 | 4 | 5 | 6 | 7 | 8 |

In the example shown in Table 1, a dot is generated at pixel position 1 and the stamp field $SF(1,y_1)$ is reset to zero for subsequent processing of other pixels. It should be appreciated that before processing an initial scanline, all the data within the stamp field may be set to a large number, indicating a large distance from a prior dot, to insure that no threshold term is added initially until after a first dot is printed. Alternatively the SF(x) values may be set to initial values chosen to help initiate a pattern of dots at the top of the image.

The stamp field SF increases at each new pixel position until position 15 wherein another dot is generated and the stamp field is reset to zero. At scanline $y_2$ the $SF(1, y_2)$ at pixel position 1 is set to 1 based on the value of the stamp field for the current position at the previous scanline (i.e., $SF(1, y_1)+1$). The distance $SF(x, y_2)$ is again reset to zero position 3. The distance increases by one at each new pixel position within scanline $y_2$ until position 15 wherein the distance to the closest pixel is reset to 1 based on the increment of $SF(15, y_1)$.

As can be seen from the above example, and in particular the processing of scanlines $y_2$ and $y_3$, the first illustrative embodiment only determines distance to dots behind the current pixel, while nearby dots at pixel positions ahead of the current may be closer than the dots behind the current pixel position. One solution to this problem uses a serpentine addressing of scanlines.

A second illustrative embodiment incorporates serpentine addressing of scanlines and maintenance of SF(x) such that the stamp field processor 46 and threshold generator 52 (steps 64-68, and 72) operate in a manner discussed with reference to Table 2. Table 2 shows the values in SF(x) for pixel positions within scanlines $y_1$-$y_5$.

TABLE 2

|   | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|----|----|----|----|----|----|----|----|----|----|----|----|
| $y_1$ | 0 | 1 | 2 | 3 | 4 | 5 | 6 | 7 | 8 | 9 | 10 | 11 | 12 | 13 | 0 | 1 | 2 | 3 | 4 | 5 | 6 |
| $y_2$ | 1 | 1 | 0 | 4 | 5 | 6 | 7 | 8 | 7 | 6 | 5 | 4 | 3 | 2 | 1 | 2 | 3 | 4 | 5 | 6 | 7 |
| $y_3$ | 2 | 2 | 1 | 2 | 3 | 4 | 5 | 6 | 7 | 7 | 6 | 5 | 4 | 3 | 2 | 3 | 4 | 5 | 6 | 7 | 8 |

TABLE 2-continued

| | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| $y_4$ | 3 | 3 | 2 | 3 | 4 | 5 | 6 | 7 | 8 | 8 | 7 | 6 | 5 | 4 | 3 | 4 | 5 | 6 | 7 | 8 | 9 |
| $y_5$ | 4 | 4 | 3 | 4 | 5 | 6 | 7 | 0 | 1 | 2 | 3 | 4 | 5 | 5 | 4 | 5 | 6 | 7 | 8 | 9 | 10 |

For purposes of discussion, the processing of scanline $y_1$ of Table 2 was performed left to right resulting in SF(x,$y_1$) having the values shown in line 1 of Table 2. Upon reaching the end of the scanline $y_1$, the processing of scanline $y_2$ begins with pixel x=21 and progresses from right to left. At pixel 21 of scanline $y_2$, SF(21,$y_2$)=SF(21,$y_1$)+1. However, at each of the pixels 20 through 15, the incremented value SF(x+1,$y_2$)+1, is greater than the value of SF(x,$y_1$)+1. Thus, SF is modified according to SF(x,$y_2$)=SF(x,$y_1$)+1 for these pixels. At pixels 14 through pixel 8 the value of SF(x+1,$y_2$)+1 is less than or equal to SF(x,$y_1$)+1 so SF is set to the former for each of these pixels. At pixel 7, the method transitions once again to using SF(x,$y_1$)+1 as the smaller value. At pixel 3, a dot is generated resulting in SF being reset to zero. At pixel positions 2 and 1, SF(x+1,$y_2$)+1 is less than or equal to SF(x,$y_1$)+1.

Upon completion of processing scanline 2, SF(x) will have the values shown in row 2 of Table 2 and processing will begin with scanline 3. Scanline 3 is processed from left to right with SF(x,$y_2$)+1 being less than or equal to SF(x−1,$y_3$)+1 for pixels 1 through 9. At pixel 10, the SF(x,$y_2$)+1 becomes less than or equal to SF(x−1,$y_2$)+1 and remains so for the remaining pixels resulting in a SF having the values shown in row 3. Scanline 4 is processed right to left resulting in SF having the values in row 4, and Scanline 5 is processed left to right resulting in SF having the values in row 5.

The above described embodiment addresses the issue of determining the distance from the closest dot occurring either ahead of or behind the current pixel through the use of serpentine addressing of scanlines and maintenance of the stamp field table. Analysis of the operation of the serpentine addressing of pixels and the resulting data shown in Table 2 reveals that the added complexity from serpentine addressing can be eliminated in favor updating values in the stamp field.

Figure 5:
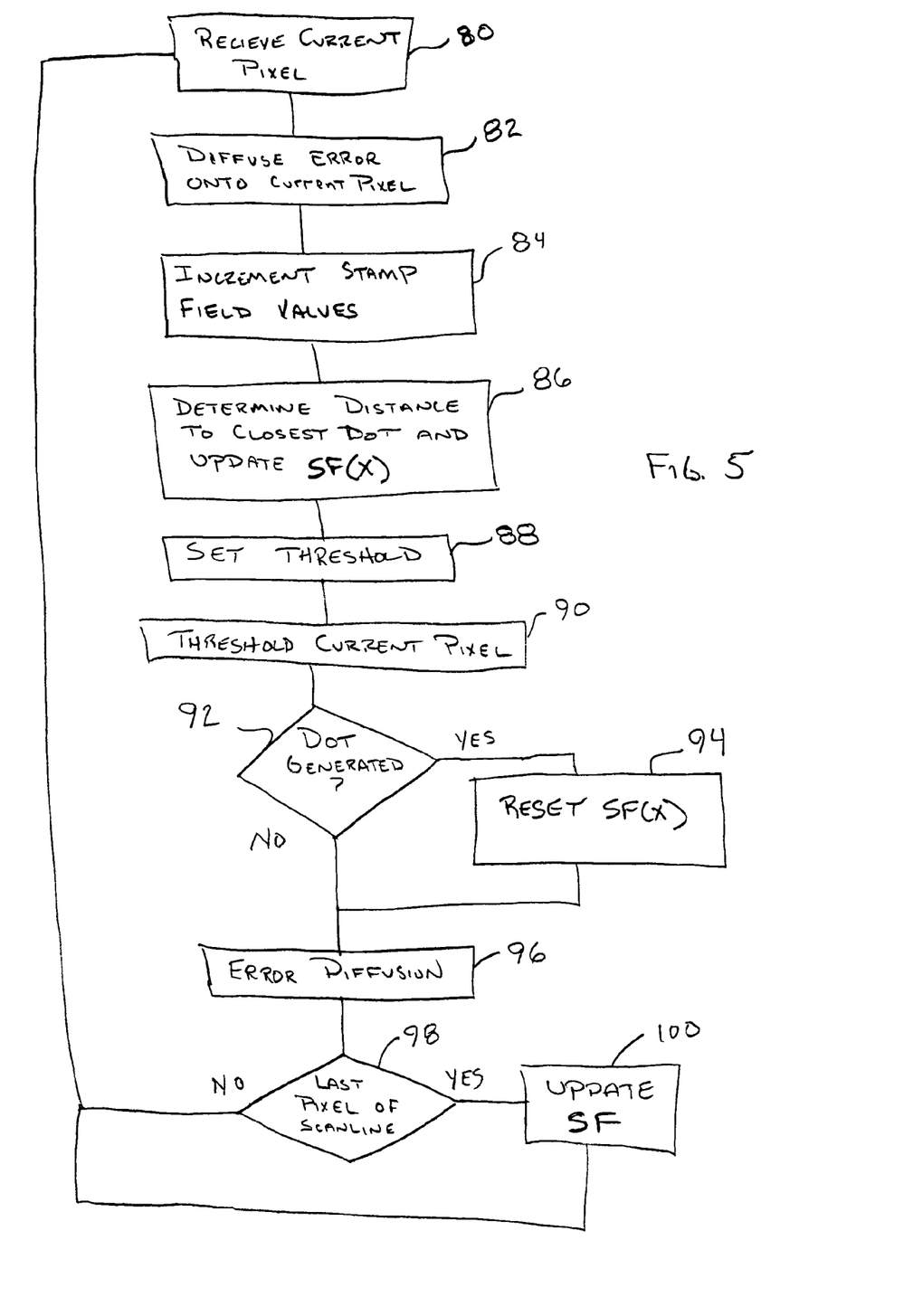
FIG. 5 is a flow chart illustrating various steps in an embodiment of an error diffusion method which employs a stamp field.

Thus, the added complexity of serpentine addressing of scanlines can be eliminated with a third illustrative embodiment which updates the values in table SF(x,y) between scanlines. FIG. 5, shows an embodiment of an error diffusion method employing a stamp field wherein the determination of the distance and threshold is performed in accordance with the third illustrative embodiment thereof. The illustrative method of FIG. 5, begins at a step 80 with the receipt of a pixel at position ($x_n$,$y_m$) having a gray level i($x_n$,$y_m$). At a step 82, the total distributed error e($x_n$,$y_m$) diffused onto the current pixel as a result of prior thresholding and diffusion processing is added to the gray level for the current pixel i($x_n$,$y_m$) to obtain modified pixel gray level i'($x_n$,$y_m$).

The illustrative method continues with a step 84 wherein the illustrative method increments the distance metric of the stamp field for the previous point on current scanline (i.e., SF($x_{n-1}$,$y_m$)+1) and the stamp field for current point from previous scanline (i.e., SF($x_n$,$y_{m-1}$)+1) and compares the incremented values. In a step 86, the illustrative method determines the distance to the closest dot, and updates SF($x_n$,$y_m$) accordingly, as the lesser of SF($x_n$,$y_{m-1}$)+1 and SF($x_{n-1}$,$y_m$)+1. At a step 88, the illustrative method sets a threshold T as a function of the SF($x_n$). In particular, step 88 may set the threshold T according to:

if $SF(x_n,y_m)<SD(i)$ then $T=T(x_n,y_m)+T'(i, SF(x_n,y_m))$
    else $T=T(x_n,y_m)$.

wherein SD(i) is the distance criterion for the given gray level, T($x_n$,$y_m$) is the initial threshold for the current pixel and T'(i, SF($x_n$,$y_m$)) is the adjustment to the threshold.

At a step 90, the illustrative method quantizes the modified gray level for the current pixel i'($x_n$,$y_m$) to one of set of available output values. More specifically, the method compares the modified gray level for the current pixel to the threshold T to determine an output value o($x_n$,$y_m$) identifying whether to generate a dot for the current pixel. At a step 92, the method determines whether the output value o($x_n$,$y_m$) corresponds to generating a dot. If so, the method resets SF($x_n$,$y_m$) to an initial value (zero in the present description) at a step 94.

After determining whether the output value o($x_n$,$y_m$) corresponds to generating a dot and, if so, resetting SF($x_n$,$y_m$) at a step 94, the method employs any common or well known error diffusion technique to diffuse a quantization error associated with the current pixel to a selected group of neighboring pixels in the image at a step 96. It should be appreciated that through step 96, the illustrative method of FIG. 5 corresponds to that of FIG. 4. The illustrative method of FIG. 5 continues with a step 98 wherein it is determined whether the pixel at ($x_n$,$y_m$) is the last pixel of the scanline. If not, the method continues at step 80 with the receipt of the next pixel within the scanline. If the pixel at position ($x_n$,$y_m$) is the last pixel of the scanline, the method updates SF(x) at a step 100.

More specifically, to identify the distance to the closest dot in either direction SF(x) must be updated in the backwards direction (opposite from the direction in which the pixels are processed) whenever a dot is printed. Recalling that whenever a dot was printed, SF(x) was reset to an initial value (zero). Thus, the values in SF(x) preceding the pixel position where the dot was generated must be updated to take into account the existence of a dot. That is, the location of a printed dot wherein the stamp field was reset to an initial value, e.g., SF(x)=0, must be identified and then for each successive pixel in the backwards direction from the printed dot, the value for the previous pixel (i.e., SF(x+1)) is incremented and used to replace the value for the current location SF(x) until the value equals or exceeds the level already in SF(x). The operation of step 100 can given by the following:

1) traverse stamp field to identify SF(x) with initial value, e.g., SF(x)=0;
2) update pixel position, e.g., x=x−1;
3) if SF(x)>SF(x+1)+1 replace SF(x) with SF(x+1)+1 and return to step 2;
4) return to step 1—traversing stamp field to identify next initial value;

As an alternative to the process of traversing the entire stamp field searching for the zeros (and the more intensive brute force method of traversing the entire stamp field and updating each value where SF(x)>SF(x+1)+1), the method of can be modified to update the values of the stamp field for previous location as the scanline is processed. More specifically, the process combines the step of updating previous values with the operation of resetting $SF(x_n,y_m)$ to an initial value at step 94. The operation of step 94 becomes:
(1) if a dot is printed set $SF(x)=0$;
(2) update pixel position, e.g., $x=x-1$;
(3) if $SF(x)>SF(x+1)+1$ replace $SF(x)$ with $SF(x+1)+1$ and repeat step 2;

An example of the operation of the method shown in FIG. 5 can be illustrated with reference to Table 3 wherein there is shown the values in $SF(x)$ for pixel positions within scanlines $y_1$-$y_5$ after processing the pixels and after updating $SF(x)$.

TABLE 3

|    | 1 | 2 | 3 | 4 | 5 | 6 | 7 | 8 | 9 | 10 | 11 | 12 | 13 | 14 | 15 | 16 | 17 | 18 | 19 | 20 | 21 |
|----|---|---|---|---|---|---|---|---|---|----|----|----|----|----|----|----|----|----|----|----|----|
| 1  | 0 | 1 | 2 | 3 | 4 | 5 | 6 | 7 | 8 | 9  | 10 | 11 | 12 | 13 | 0  | 1  | 2  | 3  | 4  | 5  | 6  |
| u1 | 0 | 1 | 2 | 3 | 4 | 5 | 6 | 7 | 6 | 5  | 4  | 3  | 2  | 1  | 0  | 1  | 2  | 3  | 4  | 5  | 6  |
| 2  | 1 | 2 | 0 | 1 | 2 | 3 | 4 | 5 | 6 | 6  | 5  | 4  | 3  | 2  | 1  | 2  | 3  | 4  | 5  | 6  | 7  |
| u2 | 1 | 1 | 0 | 1 | 2 | 3 | 4 | 5 | 6 | 6  | 5  | 4  | 3  | 2  | 1  | 2  | 3  | 4  | 5  | 6  | 7  |
| 3  | 2 | 2 | 1 | 2 | 3 | 4 | 5 | 6 | 7 | 7  | 6  | 5  | 4  | 3  | 2  | 3  | 4  | 5  | 6  | 7  | 8  |
| u3 | 2 | 2 | 1 | 2 | 3 | 4 | 5 | 6 | 7 | 7  | 6  | 5  | 4  | 3  | 2  | 3  | 4  | 5  | 6  | 7  | 8  |
| 4  | 3 | 3 | 2 | 3 | 4 | 5 | 6 | 7 | 8 | 8  | 7  | 6  | 5  | 4  | 3  | 4  | 5  | 6  | 7  | 8  | 9  |
| u4 | 3 | 3 | 2 | 3 | 4 | 5 | 6 | 7 | 8 | 8  | 7  | 6  | 5  | 4  | 3  | 4  | 5  | 6  | 7  | 8  | 9  |
| 5  | 4 | 4 | 3 | 4 | 5 | 6 | 7 | 0 | 1 | 2  | 3  | 4  | 5  | 5  | 4  | 5  | 6  | 7  | 8  | 9  | 10 |
| u5 | 4 | 4 | 3 | 4 | 3 | 2 | 1 | 0 | 1 | 2  | 3  | 4  | 5  | 5  | 4  | 5  | 6  | 7  | 8  | 9  | 10 |

In Table 3, the values in rows 1, 2, 3, 4, and 5 represent the values in $SF(x)$ after processing the pixels in scanlines y1 through y5, respectively, from left to right. Rows identified as u1, u2, u3, u4, and u5 represent the values in $SF(x)$ after the operation of updating $SF(x)$, either between processing of scanlines or during the processing of the scanline after a dot is printed. When updating the stamp field during processing of the scanline, after printing a dot at position 15 of line $y_1$, the process resets $SF(15)$ to zero and updates the values in $SF(x)$ for positions $x=14$ through $x=9$ wherein $SF(x+1)+1$ is less than $SF(x)$. Alternatively when updating between scanlines, the processes traverses the stamp field, and upon identifying a zero in position 15, begins updating the values for positions $x=14$ through $x=9$. At pixel $x=7$, the method again transitions to searching for an $SF(x)=0$. Thus, resulting in the values shown in row u1.

The pixels in scanline $y_2$ are again processed from left to right (i.e., from position $x=1$ to $x=21$). At positions $x=1$ and $x=2$, the value of $SF(x,y_1)+1$ is greater than $SF(x-1,y_2)+1$ and $SF$ is modified accordingly. At position $x=3$, a dot is printed and $SF$ is set to zero. And, if updating during the scanline processing, the value of $SF(2,y_2)$ is updated. At each of the pixel positions $x=4$ through $x=9$; the value of $SF(x-1,y_2)+1$ is less than $SF(x,y_1)+1$. At pixel 10, the $SF(x,y_1)+1$ again becomes less than or equal to $SF(x-1,y_2)+1$ and remains so for the remaining pixels resulting in a $SF$ having the values shown in row 2 of Table 3. Having completed processing of scanline $y_2$, if updating between lines, the process identifies a value of zero at position $x=3$ and updates $SF(2,y_2)$ accordingly.

In processing scanlines $y_3$ and $y_4$ no dots are printed. Thus, no values will be updated. However, if updating between scanlines, the operation will still be required to traverse the stamp field searching for a value of zero, unless the operation uses a flag which is set if at least one dot is generated on a scanline.

The illustrative embodiments described above have been described in relation to operating on symmetric or square raster image data. However, the teachings can be easily adapted to non-square raster image data (e.g, asymmetric resolution) with a simple modification to the distance calculation. When operating on image data that has greater resolution in one direction, e.g., a 1200×600 dpi image, the distance calculation simply accounts for the difference in resolution when incrementing for a change in the row or in the pixel position. More specifically, with square raster image data, e.g., 600×600 dpi, moving form pixel to pixel (or from scanline to scanline) simply meant an increment of one. That is, in moving from one pixel position to the next the $SF(x,y)$ was incremented by one, e.g., $SF(x+1,y)=SF(x,y)+1$. Similarly, stepping between scanlines was accounted for by adding one to the distance, e.g., $SF(x,y)=SF(x,y+1)+1$. However with non-square rasters, e.g., a 1200×600 dpi image, the step becomes 2. That is, the method still calculates the city-block distance, but the city blocks are 1 wide in the x direction and 2 in the y direction. The ratio of the distance increments equals the inverse ratio of the resolutions. Thus, the distance is given by $D=n|x-x'|+m|y-y'|$ wherein the factors n and m only need to approximate the ratio of the resolutions (nearly equal is often adequate) and are best integers so that distance calculations can be done without floating point calculations.

While the above description has focused on printed dots, typically for highlight regions, the technique works equally well for holes in dark regions. There are two modifications made to accommodate holes. First, if the input value is greater than or equal to some middle value, typically 128, then the SF is set to zero when a drop is not printed. Or in other words, SF is set to zero when a hole is printed. Second, if the input value is greater than or equal to that middle value then the sign of the additional threshold term T' is reversed. Thus rather than suppressing dots they are encouraged and thereby holes are moved apart as if they were suppressed. Typically the stamp distance values $SD(i)$ in the shadows for a hole are the same as they are for a dot in a highlight region. This means for a highlight value i and an equivalent shadow value 255-i $SD(i)=SD(255-i)$. If an edge occurs between a highlight and shadow region, a dot in the highlight region can suppress a hole in the shadow region and vice-versa. There is no problem with this and in general the edge enhancement effects that naturally (or intentionally) occur at these boundaries overwhelm any visual effect of relative positioning dots or holes.

Moreover, although the error diffusion techniques employing stamp field disclosed above have been described as operating on a single separation, the teachings are easily extended to color algorithms such as vector, semi-vector, and error sum (a pseudo-vector algorithm). Briefly reviewing, in vector error diffusion, colors are treated as points in a three dimensional space, with the colors printable or displayable at a given pixel discrete locations within that space. In a three color dimensional space, each of three axes define the position of the pixel. Each axis can take on a different component of the color definition, depending on the color space. In color image vector error diffusion, the error is given by the difference between the input color and the output color. A vector, defined in terms of direction and magnitude, defines the difference or error. The vector (error) is then diffused in the same way as in normal error diffusion.

In semi-vector error diffusion, the two separations with the most visually perceptive color output are compared with one another to determine their output colors, while the third, least visually perceptive separation, is treated separately. That is, for image data in three planes: Cyan, Magenta, and Yellow, the algorithm would typically operate on the C and M separations. In a thresholding operation, if the total image density from the combination of the C and M densities is above a first threshold density, then both C and M will be generated for that pixel location; if the total image density from the combination of the C and M densities is between the first threshold density and a second threshold density, the separation with the greater density will be generated; and if the total image density from the combination of the C and M densities is below the second threshold density, then neither C and M will be generated. A correction term may be applied to the yellow and/or black separations based on the color output of the first two separations to insure uniformity of ink coverage.

In the error sum technique a threshold term is created from the weighted sum of the error functions for each color. This term is subtracted from the threshold for processing each color. Thus when the amount of error is large all the colors are encouraged. To prevent all the colors from printing on top of each other at a given pixel location, as each color is processed the threshold is raised and/or lowered whenever a dot is printed or not respectively.

A more complete discussion of color error diffusion methods can be found in the following references which are incorporated by reference herein for their teachings: U.S. Pat. No. 5,621,546, entitled "Method and Apparatus for Vector Error Diffusion with Output Color Control"; U.S. Pat. No. 6,014,233 entitled "Error Diffusion for Color Images with Semi-vector Quantization"; U.S. Pat. No. 6,072,591 entitled "Sum and difference error diffusion"; and U.S. Pat. No. 6,483,606 B1, entitled "Error Diffusion on Moderate Numbers of Output Colors," U.S. Pat. No. 5,748,785 "Error Sum Method and Apparatus for Intercolor Separation Control in a printing System."

Figure 6:
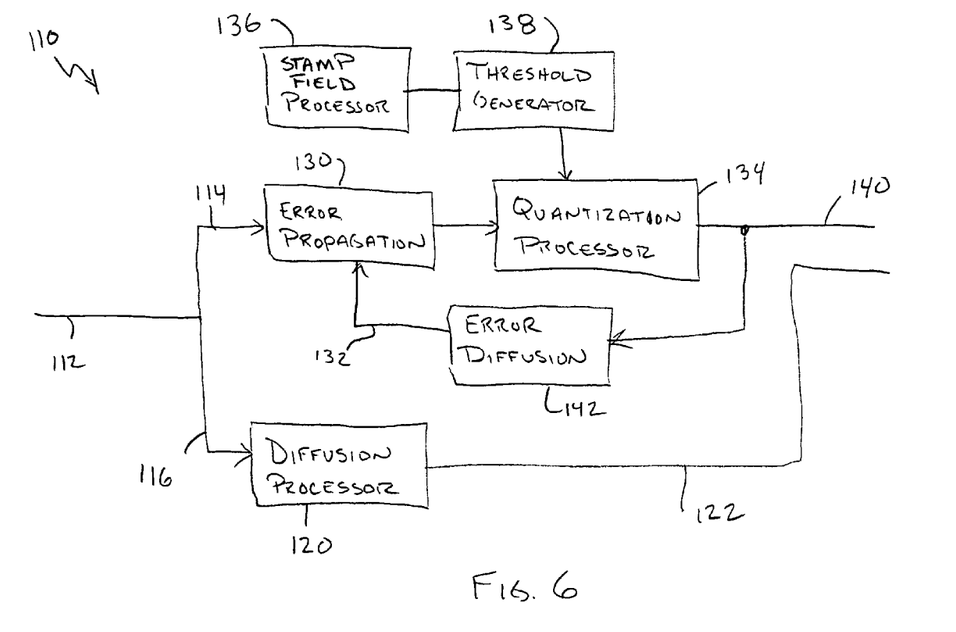
FIG. 6 Illustrates the data flow in an embodiment of an vector error diffusion processor which employs a stamp field.

Referring now to FIG. 6, there is shown a block diagram depicting the data flow in an embodiment of vector error diffusion system 110 employing a stamp field in accordance with the teachings herein. In FIG. 6, image data 112 comprising a plurality of color separations are received at diffusion processor 120 and error propagation circuit 130. More specifically, image data 114 corresponding to two of the separations of image data 112 is supplied to error propagation circuit 130 and image data 116 corresponding to a third separation is supplied to a diffusion processor 120. The separations sent to error propagation circuit 130 and processor 120 are selected in a manner such that the quantization of the darker color components can be coordinated. The separation pixels supplied to processor 120 can be processed in any manner to generate output data 122 for driving an image output terminal to print or display the image data on suitable media. As should be appreciated, processor 120 may include error diffusion processing employing a stamp field such as described and taught herein.

Image data 114 which may, for example, comprise the pixel values of the current separation pixels C(x,y) and M(x,y) of the C and M components is received at error propagation circuit 130. Error propagation circuit 130 also receives distributed error signal 132 comprising the distributed errors $e_C(x,y)$ and $e_M(x,y)$ for the previously processed cyan and magenta separations, respectively, to be applied to the current separation pixels. Propagation circuit 130 adds the distributed errors $e_C(x,y)$ and $e_M(x,y)$ to the C(x,y) and M(x,y) pixel values received as image data 114 to obtain modified pixel values which are then passed to thresholding processor 134.

Stamp field processor 136 determines the distance(s) between the current separation pixels C(x,y) and M(x,y) and the closest dot in accordance with a method incorporating city-block distances. Any of the various alternatives for determining the distance D to the closest, including those taught herein, may be employed in determining the distance to the closest dot. Threshold generator 138 sets a threshold T which is supplied to thresholding processor 134 for use in thresholding the current pixel. Briefly, threshold generator 138 sets a threshold T based on a function the distance D determined by processor 134.

Thresholding processor 134 receives modified pixel values for the C and M components and generates an output signal 140 comprising the output values $O_C(x,y)$ and $O_M(x,y)$ for the cyan and magenta separation pixels. The output values $O_C(x,y)$ and $O_M(x,y)$ can be generated using any known technique. For example the thresholding operation may generate the output signal based on a comparison of the cyan and magenta densities as described above. Output signal 140 can be used to drive an image output terminal to print or display cyan and/or magenta on suitable media. Optionally, output signal 140 is further supplied to error diffusion processor 142. Diffusion processor 142 determines quantization errors based on a difference of the gray level of input pixel value and the gray level of the output value for the cyan and magenta separation pixels. Based upon this error measurement, processor 142 redistributes or diffuses the error to a selected group of pixels within image data 114 in accordance with a set of error weighting coefficients.

To extend the use of stamp fields to vector or semi-vector techniques, several options are available for the determination of distance to the closest and setting the threshold. In one embodiment, the operation of the stamp field processor 136 determines the distance between the current separation pixel and the closest dot for each of the separations and a threshold is determined based on these two distances. That is, if the distance to the closest dot in the cyan separation is within a cyan distance criterion (e.g., $PD_c(x)<SD(c)$) a first adjustment term $T^C$ can be added to the threshold. Similarly if the distance to the closest dot in the magenta separation is within a magenta distance criterion (e.g., $PD_m(x)<SD(m)$) a second adjustment term $T^m$ can be added to the threshold. Finally, if both the distance to the closest dot in the cyan separation and the distance to the closest dot in the magenta separation are within the respective distance criteria a third adjustment term can be added to the threshold.

In another option, the stamp field processor does not distinguish between the color of the dots and simply determines the distance to the closest dot regardless of which color the dot is. More specifically, for the separations (colors) that are calculated together (e.g., cyan and magenta in a semi-vector operation), the gray levels for the pixels are summed and the nearest dot regardless of which color is determined. The "optimal" distance for the given input pixels c(x,y) and m(x,y) value is simply SD(c+m) where c and m are the gray levels of the cyan and magenta pixels, respectively. The distance to the nearest dot identifies the distance to the nearest pixel position at which a cyan and/or magenta dot was printed. The thresholds used in the thresholding operation are modified (e.g., T' is added to thresholds) if the distance criterion is not met (e.g., if PD(x)<SD(c+m)). As should be appreciated, any of the illustrative embodiments discussed above can be used to determine the distance the closest dot. That is, the illustrative embodiments operate in the same manner as described above to determine distance to the closest dot; however, for use in vector or semi-vector error diffusion they are modified such that PP(x), PD(x) and/or D are reset/updated if a dot is generated for either one of the cyan or magenta pixels.

The teachings herein can also be used for applying a distant constraint to a method for processing color image data using the error sum technique taught in U.S. Pat. No. 5,784,496 entitled "Error Sum Method and Apparatus for Intercolor Separation Control in a Printing System" incorporated herein by reference. Briefly, the algorithm of U.S. Pat. No. 5,784,496 calculates a sum of the error functions from a plurality of color separations (e.g., C, M, and K), which is used to modify the threshold at each pixel. When employing a distance constraint, a term T' can be added to the threshold if the distance to the closest dot of any color is less than SD(c+m+k) and a term T" can be added to the threshold if the distance to the closest dot of the current separation color S is less than SD(S).

What has thus been described is the application of a stamp field, which contains data representing a distance metric to a variety of error diffusion operations. It should be appreciated that the stamp field can be applied to other image processing applications and is not limited to those described above. For example, the stamp field can be applied to multilevel error diffusion processing.

The specific embodiments discussed above has focused on the use of a city-block distance to generate the distance metric which corresponded to the distance from a prior dot. However, it should be appreciated that the stamp field can generate the distance metric using alternative methods. For example, when incrementing the distance metric in response to moving between pixel positions within a scanline or between scanlines, the amount of the increment need not be constant. In addition, the distance metric need not have an initial value set to zero. Moreover, the distance metric can have an initial value representing a maximum required distance from a prior pixel with the metric being decreased as the process steps between pixel positions. As should be appreciated this would require updating the distance metric based to the greater of two values rather than the lesser as described above.

One skilled in the art would understand that the processors, processing modules and circuits described above can embody or be implemented using a special purpose computer, a programmed microprocessor or microcontroller and peripheral integrated circuit elements, an ASIC or other integrated-circuit, a digital signal processor, a hardwired electronic or logic circuit such as a discrete element circuit, a programmable logic device such as a PLD, PLA, FPGA or PAL, or the like. Furthermore, specific algorithms may be accomplished using software in combination with specific hardware. In general, any device capable of implementing a finite state machine that is in turn capable of implementing a process, function or operation described above can be used to realize the associated processor or module.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for processing image data including a plurality of scanlines with each scanline having a plurality of pixel positions, the method comprising:
   receiving an input pixel, the input pixel being located at an input pixel position within a current scanline;
   determining, using values within a stamp field array SF, a stamp field value SF(x) corresponding to the input pixel position within a scanline;
   setting a threshold value as a function of the stamp field value SF(x) corresponding to the input pixel position; and
   quantizing the input pixel based upon a comparison of the threshold value with a gray level for the input pixel.

2. The processing method according to claim 1, wherein the stamp field array comprises a plurality of stamp field values, each stamp field value representing a distance metric for a pixel position within a scanline.

3. The processing method according to claim 2, wherein the distance metric represented by the stamp field value SF(x) is a distance-order preservation metric.

4. The processing method according to claim 3, wherein the distance metric represented by the stamp field value SF(x) is based on a city-block distance calculation.

5. The processing method according to claim 2, wherein the step of setting the threshold value further bases the threshold value on the gray level of the input pixel.

6. The processing method according to claim 2, wherein the step of setting the threshold value further bases the threshold value on an average of gray levels of pixels located at pixel positions neighboring the input pixel position.

7. The processing method according to claim 1, wherein the step of determining the stamp field value SF(x) comprises:
   calculating a first value, the first value being equal to SF'(x)+n, wherein SF'(x) identifies a current stamp field value for the input pixel position and n identifies an amount corresponding to a distance increment between scanlines; and
   calculating a second value, the second value being equal to SF(x')+m, wherein x' identifies a second position within the current scanline and m identifies an amount corresponding to a distance increment between pixel positions x and x' in the current scanline;
   wherein the stamp field value SF(x) is given by the lesser of the first value and the second value.

8. The processing method according to claim 7, further comprising resetting the stamp field value SF(x) to the lesser of the first value and the second value.

9. The processing method according to claim 7, further comprising resetting the stamp field value SF(x) to an initial value when the result of the quantizing step quantizes the input pixel to a value corresponding to a dot.

10. The processing method of claim 9, further comprising updating selected stamp field values within the stamp array when the stamp field value SF(x) is reset to the initial value.

11. The processing method of claim 7, further comprising updating stamp field values within the stamp field array after receiving a pixel located in the last pixel position within the current scanline.

12. A method for processing image data including a plurality of scanlines with each scanline having a plurality of pixel positions, the method comprising:

receiving an input pixel, the input pixel being located at an input pixel position within a current scanline;

generating a stamp field value SF(x) for the input pixel position within a stamp field based on values within the stamp field wherein each stamp field value comprises a distance metric for a pixel position within a scanline;

setting a threshold value as a function of the stamp field value SF(x); and quantizing the input pixel based upon a comparison of the threshold value with a gray level for the input pixel.

13. The method for processing image data of claim 12, wherein each distance metric within the stamp field is a distance-order preservation metric.

14. The method for processing image data of claim 13, wherein the step of updating a stamp field value generates a distance metric based on a city-block distance calculation.

15. The method for processing image data of claim 12, wherein the step of updating the stamp field value SF(x) comprises:

calculating a first value, the first value being equal to SF'(x)+n, wherein SF'(x) identifies a current stamp field value for the input pixel position and n identifies an amount corresponding to a distance increment between scanlines; and calculating a second value, the second value being equal to SF(x')+m, wherein x' identifies a second position within the current scanline and m identifies an amount corresponding to a distance increment between pixel positions x and x' in the current scanline;

wherein the updated stamp field value SF(x) is given by the lesser of the first value and the second value.

16. The method for processing image data of claim 15, further comprising:

adding a diffused error to a gray level of the input pixel to obtain a modified gray level;

wherein the step of quantizing the input pixel compares the modified gray level to the threshold value.

17. The method for processing image data of claim 16, wherein the step of setting the threshold value further bases the threshold value on the gray level of the input pixel.

18. The method for processing image data of claim 12, further comprising resetting the stamp field value SF(x) to an initial value when the result of the quantizing step quantizes the input pixel to a value corresponding to a dot.

19. The method for processing image data of claim 18, further comprising updating selected stamp field values within the stamp array when the stamp field value SF(x) is reset to the initial value.

* * * * *